United States Patent [19]

Noguchi et al.

[11] Patent Number: 4,832,319
[45] Date of Patent: May 23, 1989

[54] VIBRATION ABSORBING APPARATUS

[75] Inventors: Takeshi Noguchi; Michihiro Orikawa; Tatsuro Ishiyama, all of Yokohama, Japan

[73] Assignee: Bridgestone Corporation, Japan

[21] Appl. No.: 70,189

[22] Filed: Jul. 6, 1987

[30] Foreign Application Priority Data

Jul. 8, 1986 [JP] Japan ............................... 61-160394

[51] Int. Cl.⁴ .............................................. F16F 9/10
[52] U.S. Cl. ................................ 267/140.1; 248/636; 267/219
[58] Field of Search ....................... 267/140.1, 35, 219, 267/220, 141.2; 248/636, 638, 562; 180/312

[56] References Cited

U.S. PATENT DOCUMENTS

| 2,502,322 | 3/1950 | Iredell, Jr. | 267/140.1 |
| 3,361,216 | 1/1968 | Walker | 267/140.1 |
| 4,288,063 | 9/1981 | Brenner et al. | 267/140.1 X |
| 4,383,679 | 5/1983 | Kakimoto | 267/140.1 |
| 4,399,987 | 8/1983 | Cucelli et al. | 267/140.1 |
| 4,460,168 | 7/1984 | Obadal | 267/140.1 |
| 4,664,363 | 5/1987 | Gold et al. | 267/140.1 |
| 4,706,947 | 11/1987 | Makibayashi et al. | 267/140.1 |

FOREIGN PATENT DOCUMENTS

| 0040290 | 11/1981 | European Pat. Off. |
| 3519016 | 12/1986 | Fed. Rep. of Germany |
| 59-47541 | 3/1984 | Japan |
| 0201136 | 10/1985 | Japan |
| 0002936 | 1/1986 | Japan |
| 0059034 | 3/1986 | Japan | 267/219 |
| 0055427 | 3/1986 | Japan |
| 0130639 | 6/1986 | Japan | 267/140.1 |
| 62-46041 | 2/1987 | Japan |
| 0578510 | 10/1977 | U.S.S.R. |

Primary Examiner—Andres Kashnikow
Assistant Examiner—Matthew C. Graham
Attorney, Agent, or Firm—Parkhurst, Oliff & Berridge

[57] ABSTRACT

A vibration absorbing apparatus disposed between a vibration source and a vibration receiving portion and having a tubular member which is formed such as to pass through an expandable liquid chamber and which is attached to one of the vibration source and the vibration receiving portion. A partitioning plate is secured to the outer periphery of the tubular member such as to divide the liquid chamber into a plurality of liquid sub-chambers. The liquid sub-chambers communicate with each other via an orifice. Accordingly, even if the direction in which vibration acts upon the apparatus is shifted, it is possible to prevent the occurrence of "pinch" between the partitioning plate and the tubular member.

16 Claims, 8 Drawing Sheets

VIBRATION ABSORBING APPARATUS

BACKGROUND OF THE INVENTION

1. Field of the Invention

The present invention relates to a vibration absorbing apparatus disposed between a vibration source and a portion which receives the vibration therefrom, the apparatus being capable of absorbing vibration by means of low resistance produced when a liquid passes through an orifice formed in the apparatus.

2. Description of the Related Art

It is known that a vibration absorbing apparatus may be used with various mounts for a vehicle, for example, an engine mount, a carburetor mount and a body mount. Japanese Patent Laid-open Nos. 131072/1977 and 117704/1978 previously propose vibration absorbing apparatus suitable for use in a vehicle. The conventional type of vibration absorbing apparatus includes a liquid chamber partitioned by means of an intermediate film with an orifice disposed in the thus-formed partition so that flow resistance may be produced when a liquid flows through the orifice.

In addition, Japanese Patent Laid-open No. 46041/1987 which was filed by the present applicants and laid open to public inspection on Feb. 27, 1987 previously proposed a vibration absorbing apparatus including a liquid chamber having a tubular member formed therethrough which facilitates the mounting of an engine or other component and in which, even if the direction of action of vibration is shifted, such vibration can be suitably absorbed.

However, when the direction of action of vibration is shifted, the aforementioned vibration absorbing apparatus may suffer from the occurrence of "pinch" between the tubular member and a ring slidable on the outer periphery of same. This might prevent satisfactory performance of its original absorption characteristics with respect to vibrations.

SUMMARY OF THE INVENTION

Object of the Invention

It is therefore an object of the present invention to provide a vibration absorbing apparatus which has a tubular member for facilitating the mounting of an engine or other component and yet in which, even if the direction of action of vibration is shifted, such vibration can be positively absorbed.

Brief Summary of the Invention

To achieve the aforementioned object, the present invention provides a vibration absorbing apparatus comprising: a plate member connected to one of a vibration source and a vibration receiving portion; a first resilient member attached to the plate member; a tubular member connected to the other of the vibration source and the vibration receiving portion and having an outer periphery connected to the plate member via the first resilient member; a liquid chamber formed between the plate member and the outer periphery of a lower portion of the tubular member, at least one portion of the liquid chamber being constituted by a flexible wall so that the volume of the liquid chamber may be varied by a relative displacement as between the plate member and the tubular member; a partitioning member partially secured to the outer periphery of the tubular member and disposed in the liquid chamber for dividing the liquid chamber into a plurality of liquid sub-chambers; and a liquid-flow restricting channel providing communication between the divided liquid sub-chambers and causing motion of a liquid from one of the liquid sub-chambers to the other of the same when the volume of the liquid chamber is varied.

In accordance with the present invention, therefore, the first resilient member interposed between the plate member and the upper portion of the tubular member supports the load applied from the vibration source. Since the liquid chamber is partially constituted by a flexible wall, even if the direction of action of vibration is shifted, no pinch takes place between the partitioning member and the tubular member. Consequently, although the tubular member is disposed so as to facilitate the mounting of an engine or other component, it is possible to positively absorb various vibrations which might act in different directions.

DESCRIPTION OF THE PREFERRED EMBODIMENTS

Figure 1:
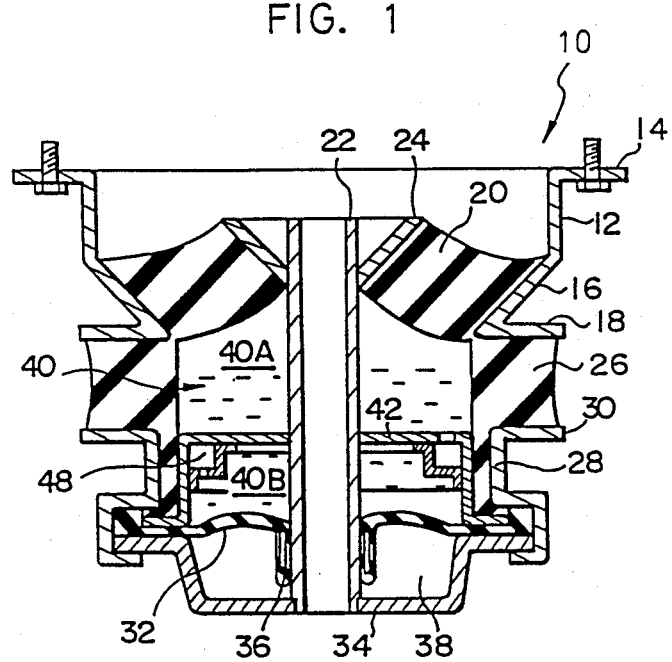
FIG. 1 is a diagrammatic, longitudinal section of a first preferred embodiment of a vibration absorbing apparatus of the present invention.

FIG. 1 illustrates a first embodiment of a vibration absorbing apparatus of the present invention. The vibration absorbing apparatus is indicated generally at 10, and includes a tubular upper plate 12 having an upper end portion thereof which is extended radially outwardly at right angles with the longitudinal axis of the apparatus 10, the upper end portion serving as a flange 14. The vibration absorbing apparatus 10 is adapted to be secured at the flange 14 to a vehicle body (not shown). The upper plate 12 constitutes a plate member connected to either a vibration source or a vibration receiving portion and has a tapered portion 16 at its low end portion, the tapered portion 16 having an internal diameter which is progressively reduced downwardly. The tapered portion 16 has a flange 18 at its lower end portion, the flange 18 extending radially outwardly in the same manner as the flange 14.

The tapered portion 16 is bonded to the outer periphery of a first resilient member 20 in a vulcanized manner. The first resilient member 20 has an approximately conical and trapezoidal configuration and a tapered inner periphery. The first resilient member 20 is bonded in a vulcanized manner to a tapered block 24 having an approximately conical and trapezoidal form. The tapered block 24 is secured to an upper end portion of a tubular member 22. An engine (not shown) may be mounted via the tubular member 22. Since a mounting bolt can be inserted into the tubular member 22, it is extremely easy to mount the engine.

The load of the engine which acts upon the tubular member 22 is transmitted to the first resilient member 20, and thus, the load is supported by the upper plate 12.

The bottom of the flange 18 is bonded to an upper end of a second resilient member 26 in a vulcanized manner, the member 26 having n approximately annular shape with a certain degree of flexibility. The lower end of the second resilient member 26 is bonded in a vulcanized manner to an upper flange 30 of a side fitting 28 having a cylindrical form. The side fitting 28 is caulked at its lower end portion so that a diaphragm 32 and the outer periphery of a lower plate 34 may be rigidly secured. The lower plate 34 has a central through-hole in which the tubular member 22 is inserted and secured. Accordingly, the lower plate 34 is vertically moved together with the tubular member 22 so that it may bear the vibration transmitted from the engine.

In the first embodiment, the diaphragm 32 has a thickness of about 2 mm. A fixed ring 36 is fitted into the center of the diaphragm 32, and the fixed ring 36 secures the center of the diaphragm 32 to the associated outer periphery of the tubular member 22. Also, an air chamber 38 is formed between the diaphragm 32 and the lower plate 34. The air chamber 38 may communicate with the exterior by forming a through-hole in a portion of the lower plate 34.

A liquid chamber indicated generally at 40 is defined by the diaphragm 32, the tubular member 22, the second resilient member 26 and the first resilient member 20. Typically, oil or other liquid is charged in the liquid chamber 40. The volume of the liquid chamber 40 is variable in accordance with variations in the respective shapes of the first and second resilient members 20 and 26. In practice, since the first resilient member 20 is subjected to the load of the engine, the member 20 is not easily deformed. Therefore, the volume of the liquid chamber may vary chiefly by the motion of the second resilient member 26 as it is deflected.

Figure 2:
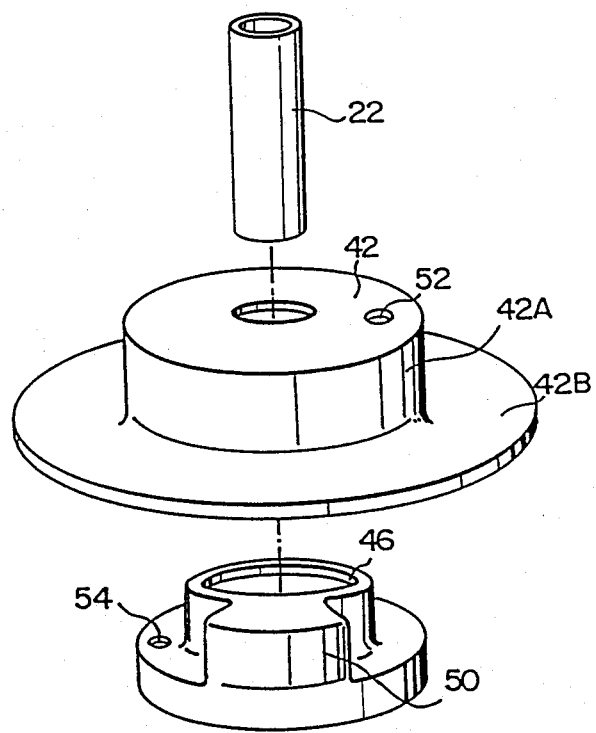
FIG. 2 is an exploded, perspective view of a portion which forms an orifice used in the first embodiment.

The liquid chamber 40 includes a partitioning plate 42 serving as a partitioning member which divides the liquid chamber 40 into an upper liquid sub-chamber 40A and a lower liquid sub-chamber 40B. As shown in FIG. 2, the outer periphery of the partitioning plate 42 has a tubular portion 42A which extends at right angles with the plane of the plate 42. The lower end portion of the tubular portion 42A has a flange 42B which extends radially outwardly. The flange 42B is clamped between the diaphragm 32 and the side fitting 28. The partitioning plate 42 is secured at its center to the outer periphery of the tubular member 22.

An adjoining plate 46 having a substantially L-shaped form in cross-section is secured to the bottom of the partitioning plate 42, and an orifice 48 is formed between the former and the latter as a liquid-flow restricting channel. The orifice 48 has a length determined by a projection 50 which is formed on a portion of the partitioning plate 42, and communicates with the upper and lower liquid sub-chambers 40A and 40B via small holes 52 and 54. The small hole 52 is formed in the partitioning plate 42 while the small hole 54 is formed in the adjoining plate 46. Consequently, the upper liquid sub-chamber 40A and the lower sub-chamber 40B communicate with each other via the orifice 48.

The operation of the first embodiment will be described below.

The upper plate 12 is secured via the flange 14 to a vehicle body (not shown), and an engine (not shown) is mounted via the tubular member 22. The load of the engine is resiliently supported by the action of the first resilient member 20 as it deforms.

When the engine vibrates, the vibration applied to the tubular member 22 is transmitted to the lower plate 34 to cause deformations of the second and first resilient members 26 and 20, respectively, thereby alternately expanding and contracting the upper liquid sub-chamber 40A and the lower liquid sub-chamber 40B. Thus, the vibration is absorbed by the flow resistance produced when a liquid passes through the orifice 48.

Also, even in a case where vibration contains a component which acts horizontally in FIG. 1, the second resilient member 26 absorbs such vibration so that the upper liquid sub-chamber 40A and the lower liquid sub-chamber 40B may be positively expanded and contracted. This prevents the occurrence of pinch and enables proper absorption of such vibration.

Figure 3:
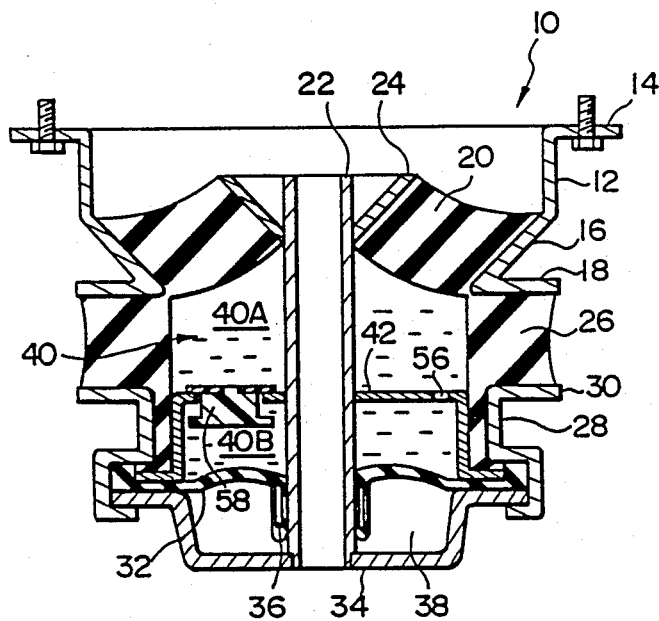
FIG. 3 is a view similar to FIG. 1, but showing a second preferred embodiment of the invention in vertical section.

FIG. 3 shows a second preferred embodiment of a vibration absorbing apparatus of the present invention.

The apparatus 10 illustrated as the second embodiment includes the partitioning plate 42 having an orifice 56 constituted by a mere through-hole instead of the orifice 48 used in the aforesaid first embodiment.

The partitioning plate 42 further includes a movable plate 58 which is inserted in the former such that one portion of the plate 58 extends into the upper liquid sub-chamber 40A with the other portion extending into the lower liquid sub-chamber 40B. The opposite ends of the movable plate 58 are enlarged so as to prevent it from coming off the partitioning plate 42.

In the second embodiment, therefore, vibrations within the relatively low frequency range are absorbed by the flow resistance produced when the liquid passes through the orifice 56. Also, if vibrations are within the relatively high frequency range, the movable plate 58 is slightly moved to vary the respective volumes of the upper liquid sub-chamber 40A and the lower liquid sub-chamber 40B, thereby absorbing such vibration.

Figure 4:
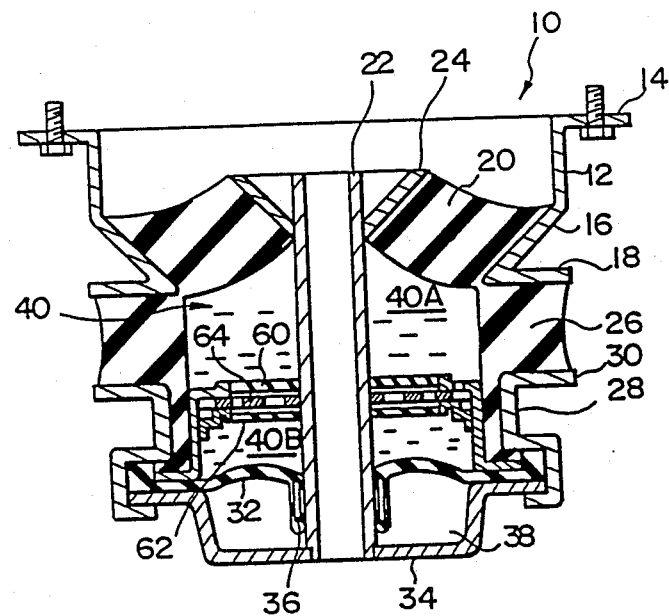
FIG. 4 is a view similar to FIG. 1, but showing a third preferred embodiment of the invention in vertical section.

FIG. 4 shows a third embodiment of the vibration absorbing apparatus of the present invention.

The apparatus 10 illustrated as the third embodiment in FIG. 4 further includes resilient films 60 and 62 which are disposed in the center of the adjoining plate 46, and vibration is absorbed by a combination of the resilient films 60 and 62, as well as the orifice 48 and the partitioning plate 42 both of which are also used in the first embodiment. A porous intermediate plate 64 is disposed in the gap between the resilient films 60 and 62, and is secured to the partitioning plate 42. The resilient films 60 and 62 are allowed to be deformed until they come into contact with the porous intermediate plate 64.

At the time of application of a vibration at a low frequency with a large amplitude, the resilient films 60 and 62 are brought into contact with the porous intermediate plate 64, and thus the vibration is absorbed by the flow resistance produced when the liquid passes through the orifice 48. At the time of application of a vibration at a high frequency with a small amplitude, the resilient films 60 and 62 act to suppress an increase in the respective inner pressures of the upper and lower liquid sub-chambers 40A and 40B, thereby absorbing such vibration.

Figure 5:
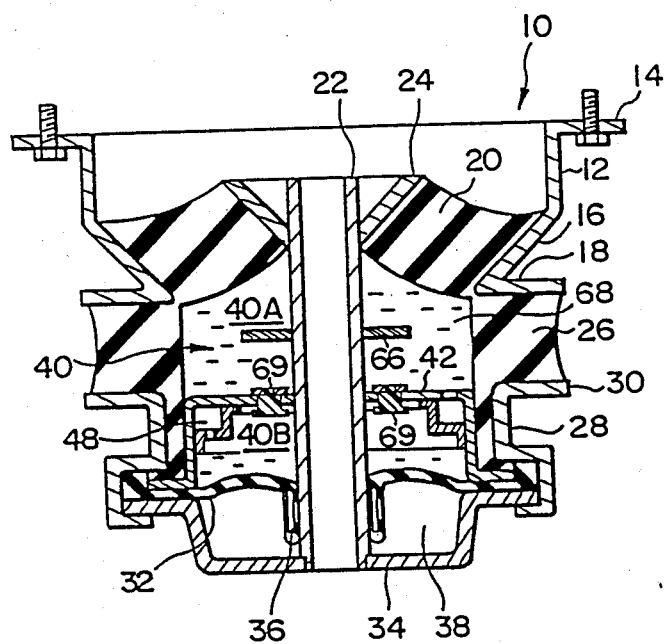
FIG. 5 is a view similar to FIG. 1, but showing a fourth preferred embodiment of the invention in vertical section.

FIG. 5 shows a fourth embodiment of the present invention.

The fourth embodiment has an orifice 68 as well as the orifice 48. A movable plate 66 is attached to the outer periphery of the tubular member 22, and the orifice 68 is formed between the movable plate 66 and the associated inner wall of the liquid chamber 40, that is, between the former and the inner periphery of the second resilient member 26. Accordingly, vibration can be absorbed by means of the resonance of a liquid column which takes place at the time of generation of a vibration at a high frequency with a large amplitude.

In this case, in order to further reduce a dynamic spring constant, a movable plate 69 having an annular shape may be attached to the partitioning plate 42 in such a manner as to surround the tubular member 22. The movable plate 69 has a configuration that is similar in cross-section to that of the movable plate 58 shown in FIG. 3. The movable plate 69 is capable of vibrating slightly, but the motion of same is restricted when it undergoes great deformation.

Figure 6:
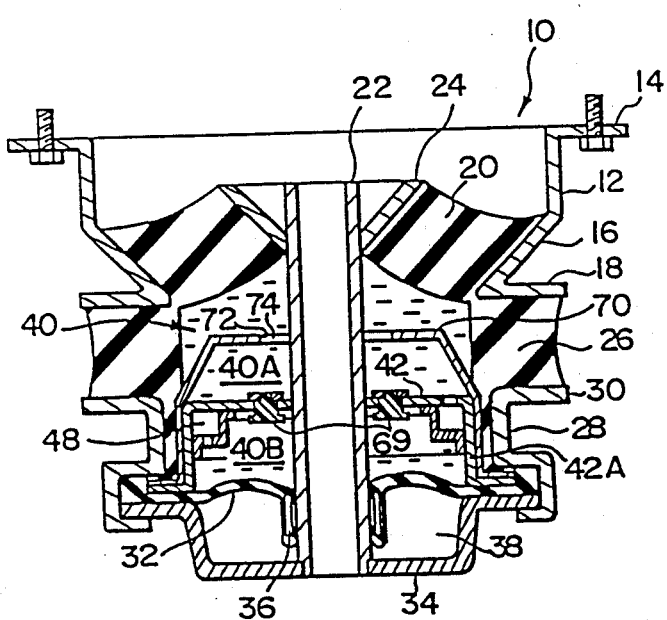
FIG. 6 is a view similar to FIG. 1, but showing a fifth preferred embodiment of the invention in vertical section.

FIG. 6 shows a fifth preferred embodiment of the invention. The fifth embodiment has an intermediate tubular member 70 in place of the movable plate 66 of the aforesaid fourth embodiment. The intermediate tubular member 70 is clamped at its lower portion between the side fitting 28 and the tubular portion 42A of the partitioning plate 42. The intermediate tubular member 70 has an upper end portion the outer diameter of which is progressively reduced. The top of the member 70 has a central opening 72, and an orifice 74 is in turn formed between the opening 72 and the outer periphery of the tubular member 22. This realizes a liquid-column resonance similar to that of the fourth embodiment.

In this case, the movable plate 69 similar to that of the fourth embodiment may preferably be disposed so as to reduce a dynamic spring constant.

Figure 7:
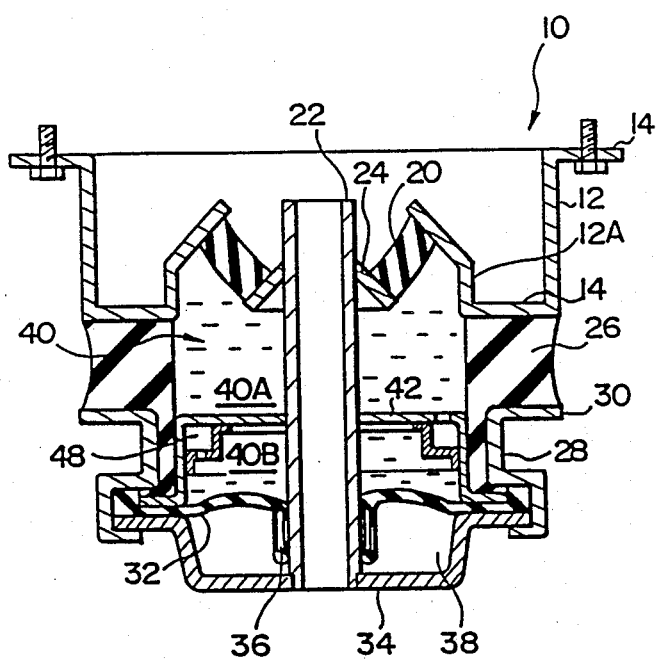
FIG. 7 is a view similar to FIG. 1, but showing a sixth preferred embodiment of the invention in vertical section.

FIG. 7 shows a sixth preferred embodiment of the invention. The sixth embodiment includes the cylindrical upper plate 12 having a lower end integral with the outer periphery of the flange 14. The flange 14 has an inner periphery integral with a small tubular portion 12A having an upper portion the inner diameter of which is progressively reduced upwardly. The outer periphery of the first resilient member 20 is bonded to the inner periphery of the small tubular portion 12A in a vulcanized manner. The first resilient member 20 differs from the respective ones used in the aforementioned embodiments in that its diameter is progressively reduced downwardly and in that its inner periphery is bonded in a vulcanized manner to the tapered block 24 which is attached in a vertically inverse manner to that of the first embodiment. Accordingly, as compared with the arrangement of the first embodiment, it is possible to further effectively expanded and contract the liquid within the liquid chamber 40.

Figure 8:
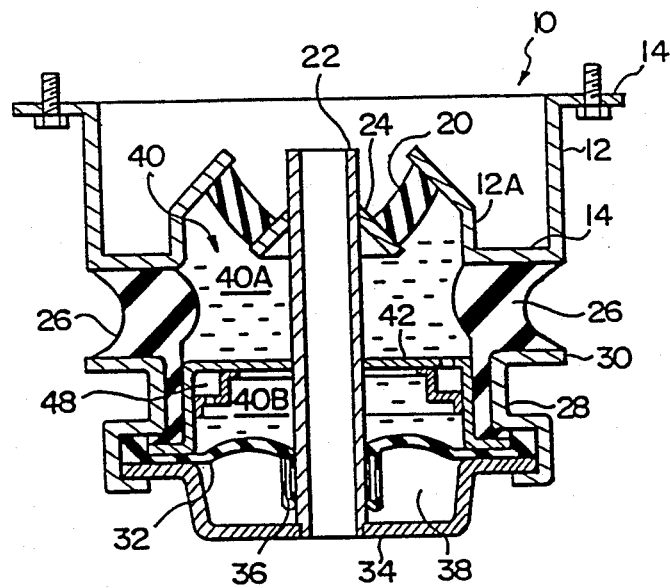
FIG. 8 is a view similar to FIG. 1, but showing a seventh preferred embodiment of the invention in vertical section.

FIG. 8 shows a seventh preferred embodiment of the present invention. The seventh embodiment has a similar construction to that of the sixth embodiment, but the second resilient member 26 has an intermediate portion in the vertical direction which projects into the liquid chamber 40. Accordingly, at the time of application of vibration, particularly at the time of application of a compressive force which may force the tubular member 22 to move upwardly, a reduction in the volume of the upper liquid sub-chamber 40A is greater than that in the volume of the lower liquid sub-chamber 40B.

What is claimed is:

1. A vibration absorbing apparatus comprising:
   a plate member connected to one of a vibration source and a vibration receiving portion;
   a resilient member, including a flexible wall having an upper flexible wall portion and a side flexible wall portion, attached to said plate member and partially defining a liquid chamber;
   a tubular member disposed to project through said resilient member and connected to the other of said vibration source and said vibration receiving portion;
   a resilient bottom member for defining a bottom of said liquid chamber and including diaphragm means disposed sealingly to a lower end of said resilient member, said tubular member sealingly projecting through said resilient bottom member;
   a partitioning member disposed in an intermediate position between said upper wall of said resilient member and said resilient bottom member, and partially secured to the outer periphery of said tubular member for dividing said liquid chamber into a plurality of liquid sub-chambers; and
   a liquid-flow restricting channel communicating between said divided liquid sub-chambers and allowing liquid to flow from one of said liquid sub-chambers to the other of said liquid sub-chambers when vibration occurs;
   whereby said liquid chamber is formed by said resilient member and said resilient bottom member so that the volume of said sub-chambers may be varied by relative displacement of said plate member and said tubular member when vibration occurs.

2. The apparatus according to claim I, wherein said resilient member is disposed opposite to the outer periphery of said tubular member for defining said liquid chamber, and said side flexible wall portion is tubular.

3. The apparatus according to claim 2, wherein said liquid sub-chambers are first and second liquid sub-chambers, said first liquid sub-chamber being positioned on the upper side of said tubular member in the direction of the axis of said tubular member and said second liquid sub-chamber being adjacent to said first liquid sub-chamber.

4. The apparatus according to claim 33, wherein said first liquid sub-chamber is partially defined by said resilient member, the volume of said first liquid sub-chamber being varied in accordance with the deformation of said resilient member.

5. The apparatus according to claim 4, wherein said second liquid sub-chamber is partially defined by said diaphragm means partially secured to said tubular member and said partitioning member, the volume of said second liquid sub-chamber being varied in accordance with the deformation of said diaphragm.

6. The apparatus according to claim 5, wherein said liquid-flow restricting channel is a first orifice.

7. The apparatus according to claim 6, wherein said partitioning member has a through-hole, a movable plate being disposed in said through-hole for fine movement with respect to high-frequency vibration.

8. The apparatus according to claim 6, wherein said partitioning member is secured to said tubular member via a porous plate with a plurality of through-holes, resilient, films being disposed such as to sandwich said porous plate.

9. The apparatus according to claim 6, wherein a movable plate is secured to the outer periphery of said tubular member, and an aperture is formed between an outer periphery of said movable plate and an inner surface of said side flexible wall portion of said resilient member so that resonance of a liquid column may be produced in response to vibration at a high frequency with a small amplitude.

10. The apparatus according to claim 6, wherein an intermediate tube is disposed in said first liquid sub-chamber, said intermediate tube forming said second orifice between said first liquid sub-chamber and said tubular member so that the resonance of a liquid column may be produced in response to vibration at a high frequency with a small amplitude.

11. The apparatus according to claim 1, further comprising a lower plate member disposed under said resilient bottom member and securely connected to both a lower end portion of said resilient member and a peripheral portion of said resilient bottom member, said lower plate member being secured to a lower end portion of said tubular member.

12. A vibration absorbing apparatus disposed between a vibration source and a vibration receiving portion, comprising:
- an upper plate connected to one of said vibration source and said vibration receiving portion;
- resilient means including spacedly disposed first resilient member attached too said upper plate and second resilient member having a cylindrical shape;
- a cylindrical member connected to the other of said vibration source and said vibration receiving portion and having an upper portion with an outer periphery connected to said upper plate via said first resilient member;
- a resilient bottom member including diaghram means disposed and connected sealingly to a lower end of said second resilient member;
- a liquid chamber defined by said first and second resilient members, and said resilient bottom member, said liquid chamber being filled up with liquid therein;
- a partitioning member disposed at an intermediate position between said first resilient member and said resilient bottom member, and partially secured to the outer periphery of said cylindrical member, said partitioning member dividing said liquid chamber along the axis of said second resilient member into an upper liquid sub-chamber in an upper portion of said second resilient member and lower liquid sub-chamber in a lower portion of said second resilient member and adjacent to said upper liquid sub-chamber, volumes of said liquid sub-chambers being varied by a relative displacement of said first and second resilient members and said resilient bottom member; and
- an orifice providing communication between said divided upper and lower liquid sub-chambers and allowing said liquid to flow from one of said upper and lower liquid sub-chambers to the other when vibration occurs.

13. The apparatus according to claim 12, wherein said second resilient member is disposed opposite to the outer periphery of said cylindrical member.

14. The apparatus according to claim 13, wherein said upper liquid sub-chamber is partially defined by said resilient means, the volume of said upper liquid sub-chamber being varied in accordance with the deformation of said resilient means.

15. The apparatus according to claim 14, wherein said lower liquid sub-chamber is partially defined by said diaphragm means partially secured to said cylindrical member and said partitioning member, the volume of said lower liquid sub-chamber being varied in accordance with the deformation of said diaphragm means.

16. The apparatus according to claim 15, further comprising:
- a lower wall member disposed under said resilient bottom member, connected to both said lower end portion of said second resilient member and a peripheral portion of said resilient bottom member, and connected securely to a lower end portion of said cylindrical member; and
- an air chamber defined between said resilient bottom member and said lower wall member at a lower portion of said cylindrical member in its axial direction and adjacent to said lower liquid sub-chamber.

* * * * *